United States Patent [19]

Ducret

[11] Patent Number: 4,674,183

[45] Date of Patent: Jun. 23, 1987

[54] CABLE SLITTING TOOL

[76] Inventor: Lucien C. Ducret, 9 Tod's Driftway, Old Greenwich, Conn. 06870

[21] Appl. No.: 827,338

[22] Filed: Feb. 7, 1986

[51] Int. Cl.⁴ ............................................. B21F 13/00
[52] U.S. Cl. ......................................... 30/90.1; 81/9.4
[58] Field of Search .............................. 30/90.1–91.2; 81/9.4, 9.44, 9.31

[56] References Cited

U.S. PATENT DOCUMENTS 2,207,044  7/1940  Whittaker .......................... 30/90.2
4,265,016  5/1981  Dueret ................................ 30/90.8

Primary Examiner—Douglas D. Watts
Attorney, Agent, or Firm—DeLio & Associates

[57] ABSTRACT

A hand tool for slitting the sheath on flat, two-conductor, plastic clad cables by means of a pointed knife which projects from a fixed mounting within the tool handle into a chamber bounded, opposite the point of the knife blade, by a sloping wall, one end of which defines an opening only slightly larger than the cross section of the cable to be cut, while the other end of the wall defines one end of an elongated opening within which the cable can be moved to assume a range of angles relative to the knife. The walls of the chamber which lie substantially parallel to the knife blade are so mounted that their spacing from the blade and from each other can be varied with micrometric precision, to ensure the location of the cut at exactly the correct distances from the edges of the flat cable.

8 Claims, 10 Drawing Figures

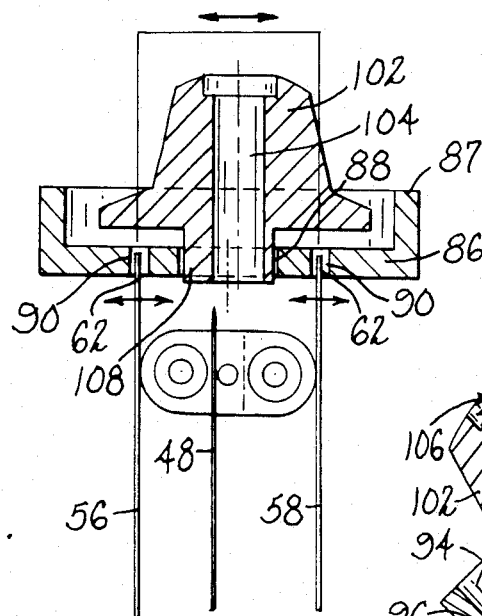
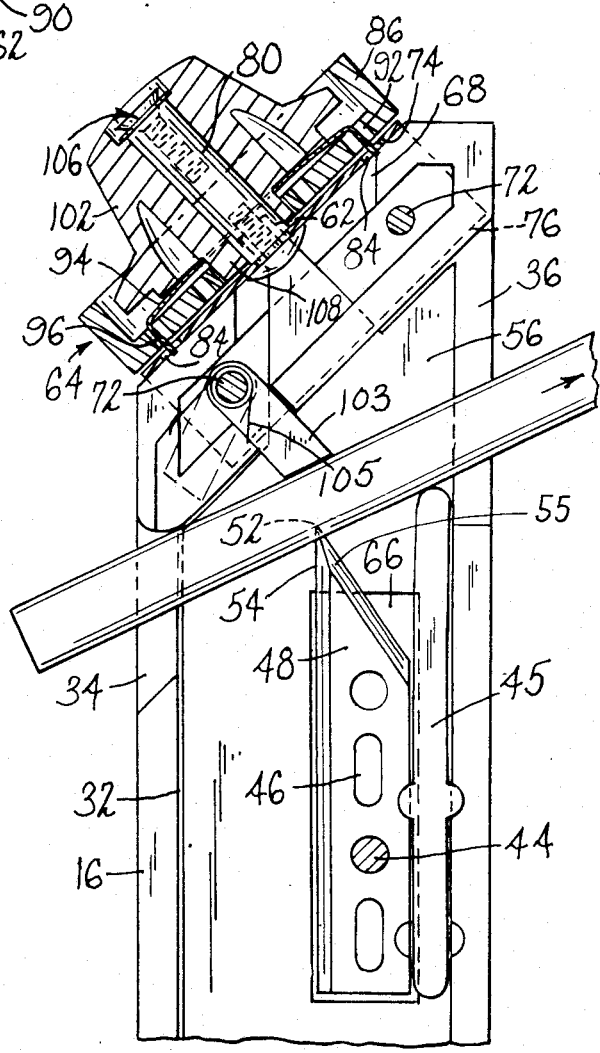

1

CABLE SLITTING TOOL

BACKGROUND OF THE INVENTION

This invention is directed to a modification of the tool disclosed in U.S. Pat. No. 4,265,016, dated May 5, 1981.

The invention relates to a hand tool for slitting the sheath of flat plastic clad cables wherein two or three similar or different conductors, each individually insulated, are assembled side by side within a single sheath. The tool is designed, like that of the above-identified patent, for easy manipulation to slit the sheath in planes which pass between the individual conductors without impairing the insulation thereof.

The background of the present invention is summarized in the cited prior patent, the text of which is here adopted by reference. The prior tool made provision for slitting cables having varying conductor arrangements by bringing variously disposed blades selectively into operative positions, whereas the present tool utilizes a single fixed blade in combination with micrometrically adjustable cutting chamber walls, to insure accurate positioning of a single knife cut on each pass of the cable end.

It is accordingly an object of the present invention to provide a tool which is readily adaptable to use with cables of varying dimensions.

It is another object of the invention to provide a tool wherein the spacing of the lateral support (i.e., the cutting chamber wall) from the cutting plane of the blade can be very precisely determined.

It is a further object of the invention to provide chamber guide walls which are so mounted that their spacing from each other and/or their positioning with respect to the blade can be adjusted in unison or independently, at the operator's option.

It is yet another object of the invention to provide certain improvements in the form, construction, and arrangement of the several parts whereby the above named and other objects may effectively be attained.

The invention accordingly comprises the features of construction, combinations of elements, and arrangements of parts which will be exemplified in the constructions hereinafter set forth, and the scope of the invention will be indicated in the claims.

Practical embodiments of the invention are shown in the accompanying drawings wherein:

FIG. 9 represents a detail vertical section of the adjustment sub-assembly shown in FIGS. 2, 4, 5, 6 and 7 with a section of the cable being slit, in one operative position; and FIG. 10 represents a detail vertical section (like FIG. 2 but not exploded) showing a modified form of cable locating means.

Figure 1:
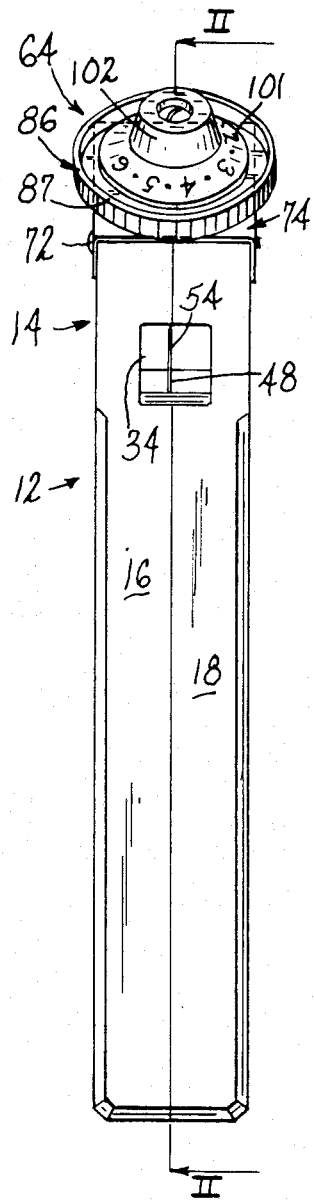
FIG. 1 represents a front elevation of the tool shown approximately full size.

Referring to the drawings, the tool body comprises a handle portion 12 and head portion 14, integral with the handle portion, constituted by the face-to-face fitting together of the complementary tray-like body sections 16, 18, each being made of a strong molded plastic material. Near the bottom, the section 16 has an internal block 20 which is threaded to receive a screw 22 passing through a hole in the matching block 24, integral with the body section 18. Complementary inner wall portions 26, 28 divide the interior of the tool into a small closed lower chamber 30 and an elongated upper chamber 32 which is provided with oppositely disposed cable-receiving openings 34, 36 in the head portion 14 of the tool corresponding to the openings 28, 29 in the tool of U.S. Pat. No. 4,265,016).

Integral with the body section 16 is a blade mounting base 40 constituted by one or more posts or blocks and base 40 constituted by one or more posts or blocks and including the threaded block 42 into which the mounting screw 44 is screwed, to hold the body section 18 in engagement with the body section 16. The posts or blocks 41' may be shaped at their inner ends to engage in the openings 46 of the blade 48 and the body portion 18 is provided with inner body wall supporting elements 50 whose edges rest on the blade and hold it firmly in engagement with the posts or blocks 40, all as shown clearly in FIGS. 2 and 3. The space between the straight side of the blade and the adjacent body wall is occupied by a filler 43 (FIG. 2) and a cable guide strip 45 is located along the opposite edge of the blade, this strip being adjustable between the retracted position shown in FIG. 2 and the raised position shown in FIG. 10.

The blade 48 is elongated and provided with a very sharp point 52 and a beveled cutting edge 55, facing the opening 36, intersecting the vertical cutting edge 54 which faces the opening 34. Only a single blade is used, and it can be removed, as for replacement, repair or sharpening, by releasing the screws 22 and 44 and separating the body sections 16, 18.

The position of the blade being fixed, adjustments to effect the cutting of cables having slightly differing spacing and/or sizes of conductors must be made by varying the positions of the tool walls on each side of the fixed blade. This is made possible by the provision of the elongated wall plates 56, 58 which are spring steel strips having their lower ends firmly fixed by screws 60 in the lower end of the chamber 32. Their upper ends are beveled and provided with operating tabs 62 for engagement with the adjusting mechanism 64, to be described below. Each wall plate is cut away, as indicated at 66, to accommodate such projections from the adjacent body sections as the blade mounting base 40 and the body wall supporting elements 50.

Figure 2:
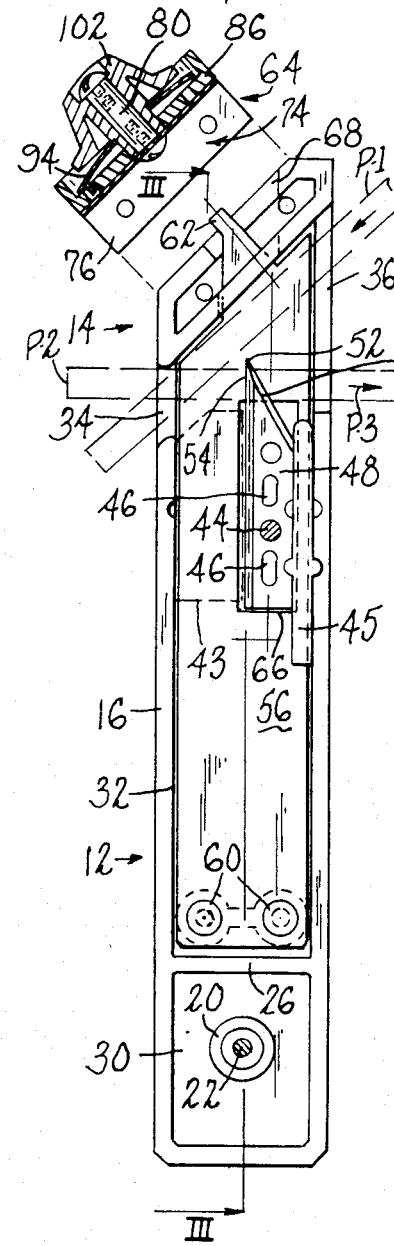
FIG. 2 represents a partially exploded vertical sectional view on the line II—II of FIG. 1, two positions of the cable being cut being indicated in broken lines.
Figure 3:
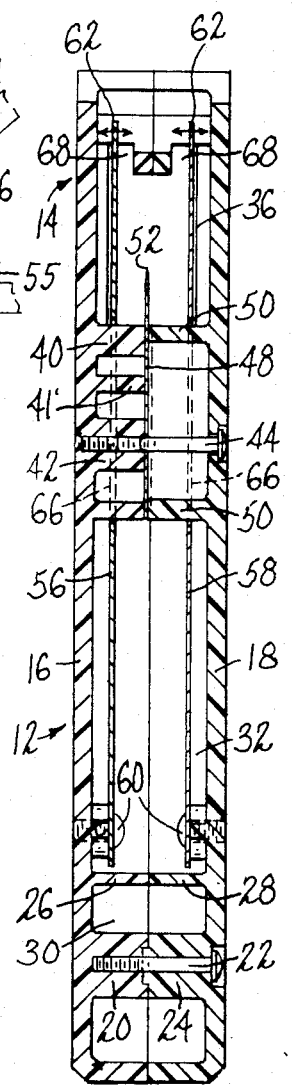
FIG. 3 represents a vertical sectional view on the line III—III of of FIG. 2, the adjustability of the chamber walls being indicated by arcuate double-ended arrows.
Figure 4:
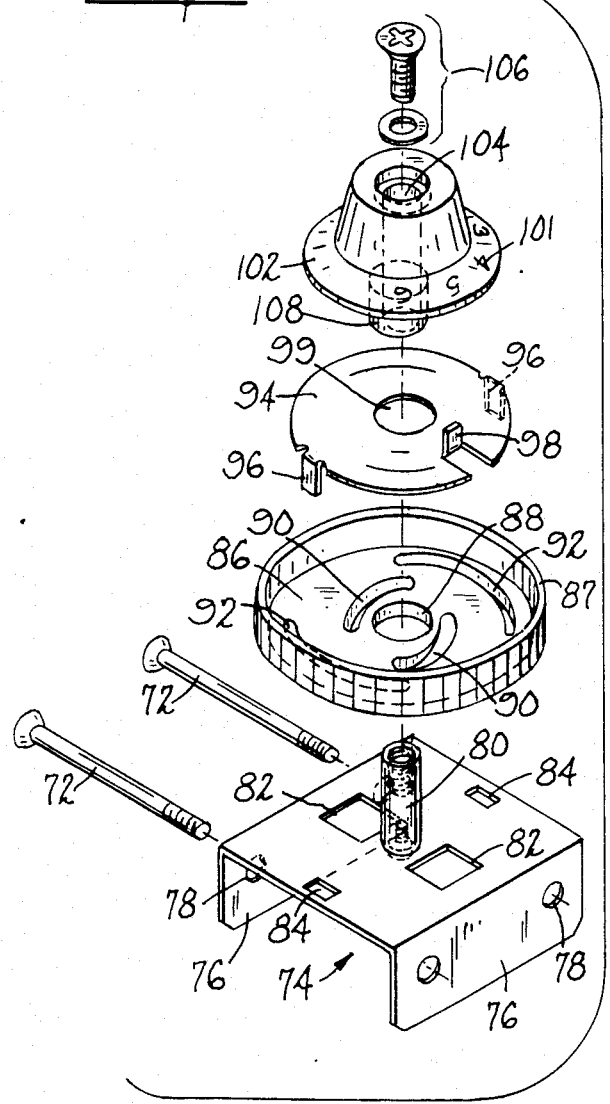
FIG. 4 represents an exploded perspective view of the wall adjusting assembly, on an enlarged scale.
Figure 5:
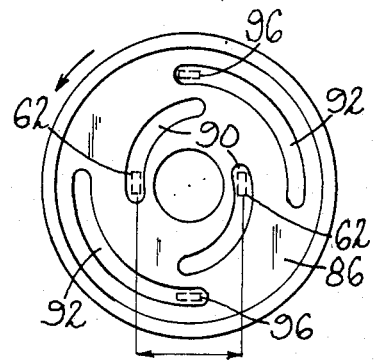
FIGS. 5 and 6 represent plan views of the wall adjusting cam disc in two operative positions, corresponding to minimum and maximum spacing of the chamber walls, respectively.
Figure 6:
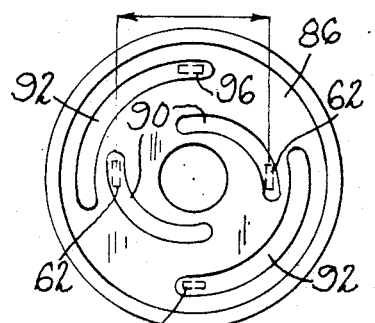
Figure 7:
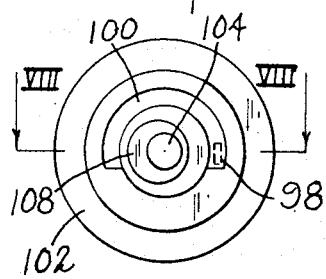
FIG. 7 represents a plan view of the eccentric cam which shifts both chamber walls in unison when their spacing has been adjusted as shown in FIGS. 5 and 6.

The wall plate adjusting mechanism 64 is shown assembled in FIG. 2 and exploded in FIG. 4, while FIGS. 5 and 6 show different positions of the plate spacing cam disc and FIGS. 7 and 9 show details of the eccentric wall locator.

Figure 8:
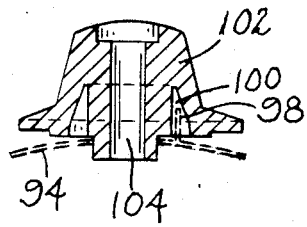
FIG. 8 represents a detail vertical section on the line VIII—VIII of FIG. 7, the position of the disc spring, shown in perspective in FIG. 4, being indicated in broken lines.

As shown in FIG. 2, the upper ends of the body sections 16, 18 are slanted and provided with an aperture 68, through which the tabs 62 project, and with holes 70 to receive the long screws 72. The mechanism 64 includes a saddle 74 having flanges 76 with holes 78 positioned to match the holes 70 and receive the screws 72. A post 80 is mounted centrally on the saddle 74, and the saddle is provided with apertures 82 near the post and smaller apertures 84 at diametrically opposite points adjacent its edges. The double cam disc 86 has a central hole 88, sized to fit on the eccentric cam, described below, and spirally disposed cam slots 90, as well as arcuate stop tracks 92. Each slot 90 and track 92 extends through an arc of 90°. A disc spring 94 has downwardly projecting locking tabs 96, an upwardly projecting tab 98 which engages in the semi-circular track 100 in the lower face of the operating knob 102 (FIGS. 7 and 8), and a central hole 99 which also fits on the eccentric cam. The knob has an axial bore 104 which fits on the post 80 where the knob is rotatably secured by means of the screw and washer 106. The bottom of the knob is provided with an eccentric cam portion 108 which is sized to fit in the central holes 88 and 99 of the cam disc 86 and the disc spring 94, respectively.

When the parts just described are assembled, the saddle 74 is firmly mounted on the upper end of the body sections 16, 18 with the tabs 62 of the wall plates projecting through the apertures 82 and into the cam slots 90 (as shown by FIGS. 5 and 6). The cam disc 86 is mounted on the eccentric cam portion 108, and the disc spring 94 is placed on the disc 86 with the locking tabs 96 passing through the arcuate slots 92 and into the apertures 84 in the saddle. The tab 98, projecting into the semi-circular (180°) track 100 serves as a stop to limit rotation of the knob and its eccentric 108.

The saddle apertures 82 are diagonally opposite each other, with reference to the post 80, and are large enough to permit movement of the wall plate tabs 62 toward and away from each other as the cam disc 86 is rotated, as well as simultaneous side-to-side movement of the wall plate tabs in response to rotation of the eccentric 108.

The high and low points of the eccentric 108 are disposed diametrically opposite. The fine adjustments of the spacing of the wall plates can be effected by rotation of the cam disc 86 through a 90° range, while lateral adjustment of the wall plates, in any spaced relation, can be effected by rotation of the knob 102 and eccentric cam 108, such rotations being limited to 180° by the movement of the tab 98 in the track 100.

To insure accuracy and uniformity in the adjusted settings of the wall plates, suitable calibrations 101 are provided on the knob 102 and can also be placed on the rim 87 of the cam disc 86.

In use, the cut end of a cable to be stripped is examined to ascertain the size and spacing of the conductors (two or three) and the overall width of the cable. The cam disc 86 is rotated to place the wall plates a proper distance apart for receiving and guiding the cable, and the knob 102 is turned to place the spaced wall plates in proper relation to the fixed cutting blade for making a first cut. The cable end to be stripped is inserted through the apertures 36 and 34 past the point 52 of the blade to a desired distance (e.g., a few inches), as indicated at P-1 in FIG. 2, and is then moved to position P-2 where the blade penetrates the insulation and cuts it as the cable is pulled in the direction of the arrow P-3.

When the guide strip 45 is in the retracted position of FIG. 2, the blade can cut all the way through the cable. Two cuts, each spaced a fixed distance from a cable edge, can be made by setting the wall plates as shown in FIG. 9, the cable end being rotated 180° after a first cut has been made in order to effect a second symmetrically located cut. If partial penetration is desired, the guide strip can be set in the raised position of FIG. 10. In this case, the retractable pawl 103, which is biased by spring 105, is lowered to prevent the cable from lifting off the blade and a cut of precisely limited depth can be effected as shown in FIG. 10.

To meet the possible need for a tool having a narrower range of adjustability, a modified tool could have only a single wall plate, its position being adjusted either by engagement with a spiral slot in a rotatable cam disc or by rotation of an eccentric cam, each of which is described above.

It will thus been seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

What is claimed is:

1. A cable slitting tool comprising an elongated hollow body having walls defining a handle portion and a head portion,
    an elongated cutting blade fixed within the handle portion of the hollow body and having a sharp pointed end projecting into said head portion,
    apertures in the walls defining the head portion in areas oppositely located with respect to said sharp pointed blade end,
    at least one elongated adjustable wall plate having one end fixedly mounted within the handle portion and its outer end extending past and spaced from said blade end,
    and means for adjusting the position of said wall plate to vary its spacing from the blade end.

2. A cable slitting tool according to claim 1 wherein the wall plate is flexible and has one end fixed to an adjacent wall and another end engaged with said adjusting means.

3. A cable slitting tool according to claim 1 wherein said adjusting means includes a rotatable cam disc operatively associated with said at least one wall plate.

4. A cable slitting tool according to claim 1 which includes,
    a pair of wall plates each mounted within the handle portion and extending past and spaced from said blade, one plate being on each side of said blade and lying parallel thereto, and
    means for adjusting the positions of said wall plates to very the spacing thereof from each other and their location relative to the blade.

5. A cable slitting tool according to claim 4, wherein each wall plate is elongated and flexible and has one end fixed to an adjacent wall and another end engaged with said adjusting means.

6. A cable slitting tool according to claim 5 wherein said adjusting means includes,
    a rotatable cam disc having cam tracks, each engaged with an end of a wall plate.

7. A cable slitting tool according to claim 6 wherein said adjusting means includes,
an eccentric mounting for said cam disc whereby the position of both wall plates can be adjusted simultaneously.

8. A cable slitting tool according to claim 1 which includes means in the head portion adapted to insure that a cable inserted through said apertures comes into cutting engagement with the blade.

* * * * *

UNITED STATES PATENT AND TRADEMARK OFFICE
CERTIFICATE OF CORRECTION

PATENT NO. : 4,674,183
DATED : June 23, 1987
INVENTOR(S) : Lucien C. Ducret

It is certified that error appears in the above—identified patent and that said Letters Patent are hereby corrected as shown below:

In the Description

Column 1, line 56, delete the word "of" before "FIG. 2".

Column 2, line 23, insert --(-- prior to the word "tool".

Column 2, line 27, delete all of line 27.

Signed and Sealed this

Thirteenth Day of October, 1987

Attest:

DONALD J. QUIGG

Attesting Officer

Commissioner of Patents and Trademarks